US010155157B2

(12) United States Patent
Bush et al.

(10) Patent No.: US 10,155,157 B2
(45) Date of Patent: Dec. 18, 2018

(54) MOBILE CONTROLLER AND CARRIER DEVICE

(71) Applicant: Thinkative Inc., Provo, UT (US)

(72) Inventors: Benjamin Farris Bush, Provo, UT (US); Brandon Black, Provo, UT (US); Benjamin Taylor, Provo, UT (US)

(*) Notice: Subject to any disclaimer, the term of this patent is extended or adjusted under 35 U.S.C. 154(b) by 0 days.

(21) Appl. No.: 15/447,109

(22) Filed: Mar. 2, 2017

(65) Prior Publication Data

US 2017/0252646 A1 Sep. 7, 2017

Related U.S. Application Data

(60) Provisional application No. 62/302,375, filed on Mar. 2, 2016.

(51) Int. Cl.

| A63F 13/24 | (2014.01) |
|---|---|
| A63F 13/92 | (2014.01) |
| A63F 13/98 | (2014.01) |
| A63F 13/214 | (2014.01) |

(52) U.S. Cl.
CPC ............ *A63F 13/24* (2014.09); *A63F 13/214* (2014.09); *A63F 13/92* (2014.09); *A63F 13/98* (2014.09)

(58) Field of Classification Search
CPC ......... A63F 13/24; A63F 13/214; A63F 13/92
See application file for complete search history.

(56) References Cited

U.S. PATENT DOCUMENTS

| 2007/0060216 | A1 | 3/2007 | Huang |
| 2007/0123309 | A1 | 5/2007 | Sano |
| 2010/0328203 | A1 | 12/2010 | Hsu |
| 2013/0120258 | A1 | 5/2013 | Maus |
| 2013/0341214 | A1 | 12/2013 | King |
| 2014/0228075 | A1 | 8/2014 | Baschnagel |
| 2015/0042567 | A1* | 2/2015 | Funakoshi ............ G06F 3/0202 345/168 |
| 2016/0070304 | A1* | 3/2016 | Shin ................... H04M 1/0268 361/679.26 |

OTHER PUBLICATIONS

JP2009267490, Matsumoto Tetsuzo; Furuya Tomohiko + (Matsumoto Tetsuzo, ; Furuya Tomohiko).*

* cited by examiner

*Primary Examiner* — William H McCulloch, Jr.
*Assistant Examiner* — Yingchuan Zhang
(74) *Attorney, Agent, or Firm* — Steinberg Intellectual Property Law LLC; Gloria M. Steinberg

(57) ABSTRACT

Disclosed are a combination controller unit and a carrier device for handheld electronic devices. The device comprises a main section that removably attach to a handheld device around the perimeter thereof. The device further includes a first section opposite a second section, wherein each of the first and second sections folds and extends outward from the main section in a substantially wing-like fashion. Each of the first and second sections includes a plurality of control buttons for inputting commands to the handheld device. Embedded within the sections is a flex circuit that is configured to at least partially bend onto itself so as to manipulate the sections to and from an operating configuration and a storing configuration.

17 Claims, 8 Drawing Sheets

MOBILE CONTROLLER AND CARRIER DEVICE

FIELD OF THE INVENTION

The present invention generally relates to controller systems and input devices. More particularly, the present invention is directed to a combination controller unit and carrier for handheld devices.

BACKGROUND OF THE INVENTION

With the advent of smartphones and other handheld devices, mobile games are becoming increasingly popular. Generally, control buttons that are integral to the handheld devices, or virtual buttons on the devices' display screens are used with existing mobile games to provide input to the games, typically to control an object or character in the game. However, these control buttons are often difficult to use for gaming purposes and do not allow users accurate input. Thus, some users utilize external controllers or special purpose devices, such as joysticks for maneuvering games, steering wheels for driving games, and guns for shooting games.

These external controllers and special purpose devices are usually connected to the handheld devices by means of a wire or cord, although some controllers are wireless. Accordingly, controllers are generally carried separately from handheld devices and are stowed away when not in use. Thus, having a separate controller unit can be inconvenient and cause annoyance to users. This can be disadvantageous for users who frequently play mobile games on the go. In this regard, the invention described herein addresses this problem.

Devices have been disclosed in the prior art that claim controller accessories for handheld devices such as phones and tablet computers. These include control modules that have been patented and published in patent application publications. The foregoing is a list of devices deemed most relevant to the present disclosure, which is herein described for the purposes of highlighting and differentiating the unique aspects of the present invention, and further highlighting the drawbacks existing in the prior art.

Specifically, King, U.S. Patent Application Publication Number 2013/0341214, discloses a phone case that comprises controllers that slide out from opposing ends of the case. The controllers are disposed on the sliding sections so that they are accessible from the front of the phone when they slide outward. In this regard, the sections do not fold and move in an ergonomic manner.

Huang, U.S. Patent Application Publication Number 2007/0060216, and Hsu, U.S. Patent Application Publication Number 2010/0328203, disclose controller sections that are swivably attached to a housing member of a phone case. More particularly, Huang discloses a first controller section that is disposed at the bottom of the phone and that can be secured at the back or at an angle; and a second controller section that is secured in place at the front of the phone. Similarly, Hsu discloses a controller section that can be secured to the back of the case and then moved towards the front of the screen. Thus, these devices also do not disclose sections that can fold into extended and storage configurations.

Baschnagel, U.S. Patent Application Publication Number 2014/0228075, and Maus, U.S. Patent Application Publication Number 2013/0120258, disclose controllers that can attach to one side of a handheld device. Baschnagel discloses a controller unit that can removably attach to the lower end of the handheld device. Thus, Baschnagel is not configured to hold a handheld device therein. Maus discloses a case, but the controller unit is biased toward one side of the handheld device. However, Maus does not comprise any sections that fold out.

Finally, Sano, U.S. Patent Application Publication Number 2007/012309, discloses a phone case with control buttons disposed thereon. In operation, the user can rotate the phone to orient it in a portrait or landscape configuration. In this regard, the controllers are not moved. Thus, Sano does not disclose any foldable sections comprising control buttons thereon.

In view of the disadvantages inherent in the known types of controller accessories for handheld devices now present in the prior art, the present invention provides an improved controller unit having dynamic, foldable components, wherein the controller unit can be removably attached to various handheld devices.

SUMMARY OF THE INVENTION

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as to prelude to the more detailed description that is disclosed later.

In some embodiments, the present invention comprises a combination controller unit and a carrier device for handheld electronic devices, wherein the handheld electronic devices comprise smartphones, tablet computers, and the like. The controller unit and carrier device comprise a main section that is configured to removably attach to a handheld device. The device further comprises a first section opposite a second section, wherein each of the first and second sections folds and extends inward and outward from the main section in a substantially wing-like fashion.

The sections further comprise a flex circuit or a flex printed circuit board (PCB) embedded therein. The flex circuit comprises a middle section having a first and second side sections extending therefrom. The middle section of the flex circuit is embedded within the main section of the device, and the first and second side sections of the flex circuit are embedded within the first section and the second section of the device, respectively. Each of the first and second side sections of the circuit is configured to bend away from and toward the middle section. In this y, the first and second sections can fold inward and outward from the main section via the flex circuit.

The first and second sections include a user interface navigation device thereon, wherein the user interface navigation comprises a plurality of control buttons, joystick buttons, touchpad, and/or other pointing instruments. The buttons can be used to provide user input to the handheld device on which the device is installed. In this regard, it is contemplated that the present invention utilizes direct connection, Bluetooth®, NFC, or similar means to connect to the handheld device.

In operation, the first and second sections lift and bend away from the main section in opposite directions, and then fold partially around the handheld device such that the terminal ends of the first and second sections frame the display screen (i.e., the front side) of the handheld device. In storage, the first and second sections are moved in the reverse direction and toward the main section (i.e., the back side) of the handheld device so that the first and second sections lie flat adjacent to each other and directly against the main section.

Preferably, the present invention is shaped and dimensioned so that it is not bulky and can resemble a conventional handheld device carrier or case when not in use. Accordingly, the present invention is highly advantageous in that it provides a fully functional controller system while adding minimum girth and weight to the handheld device.

It is, therefore, an object of the present invention to provide a combination controller unit and carrier device that can be retrofitted to existing handheld devices.

It is still another object of the present invention to provide a combination controller unit and carrier device that can be used as a case for a handheld electronic device on which it is installed.

It is still another object of the present invention to provide a combination controller unit and carrier device that can flex and bend to and from an extended configuration and a storage configuration.

It is still another object of the present invention to provide a combination controller unit and carrier device that comprises a slim, low-profile so as to increase portability and ease of use thereof.

It is still another object of the present invention to provide a combination controller unit and carrier device that can establish a connection to a handheld electronic device via Bluetooth®, NFC, or other suitable methods.

A final object of the present invention to provide a combination controller unit and carrier device that may be readily fabricated from materials that permit relative economy and commensurate with durability.

In the light of the foregoing, these and other objects are accomplished in accordance with the principles of the present invention, wherein the novelty of the present invention will become apparent from the following detailed description and appended claims.

BRIEF DESCRIPTION OF THE DRAWINGS

The above and other objects and advantages of the present invention will be apparent upon consideration of the following detailed description, taken in conjunction with the accompanying exemplary drawings, in which like reference characters refer to like parts throughout, and in which.

DETAILED DESCRIPTION OF THE INVENTION

The present invention is directed towards a combination controller unit and carrier device. For purposes of clarity, and not by way of limitation, illustrative views of the present invention are described with references made to the above-identified figures. Various modifications obvious to one skilled in the art are deemed to be within the spirit and scope of the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or." Additionally, the articles "a" and "an" as used in this application and the appended claims should generally be construed to mean "one or more" or "at least one" unless specified otherwise or clear from context to be directed to a singular form. Finally, the terms "flex printed circuit(s)," "flexible printed circuit(s)," "flex printed circuit board(s)," "flexible printed circuit board(s)," "flex circuit(s)," and "flexible circuit(s)," are used interchangeably unless the context clearly suggests otherwise.

Figure 1:
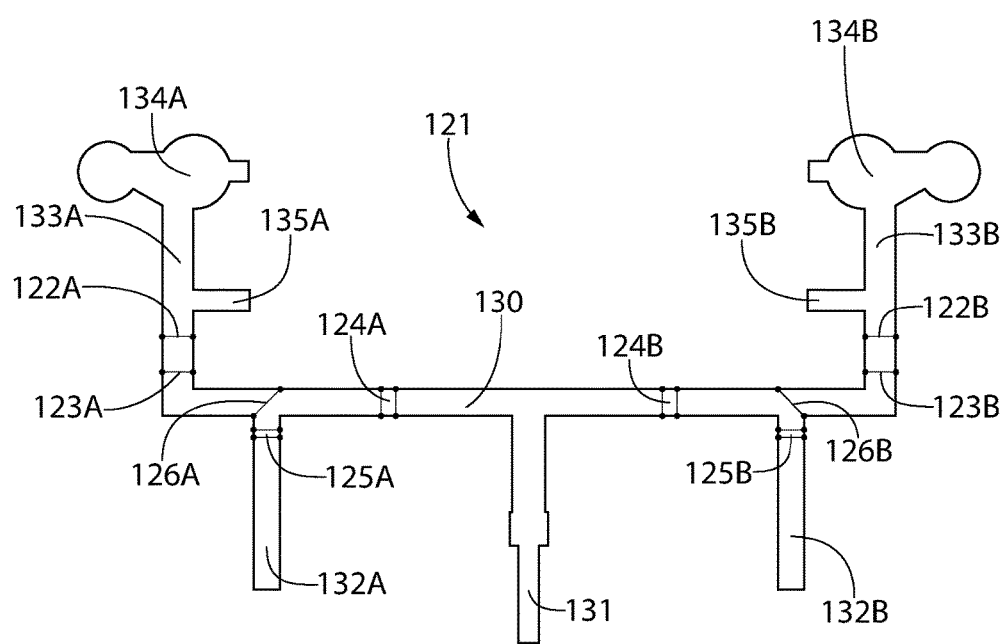
FIG. 1 is a top down view of the flex PCB frame structure of the present invention.

Referring now to FIG. 1, there is shown a top down view of the flex PCB frame structure of the present invention. The flex PCB frame structure is embedded within the carrier device of the present invention. The flex PCB frame structure 121 comprises a middle section 130 having a first side section 133A and a second side section 133B perpendicularly extending from opposing ends thereof, forming an elbow or a corner where the first side section 133A and the second side section 133B join the middle section 130. The middle section 130 further comprises a first leg 132A, a second leg 131, and a third leg 132B extending perpendicularly therefrom, wherein the first leg 132A and the third leg 132B are substantially equal in length, and the second leg 131 extends beyond the first leg 132A and the third leg 132B. In the illustrated embodiment, the legs 132A, 131, 132B point away from the first side section 133A and the second side section 133B.

Each of the first side section 133A and the second side section 133B comprises a rounded portion at terminal ends 134A, 134B thereof, wherein the rounded portions are configured to align with control buttons, bumpers, and/or joystick buttons. Additionally, the first side section 133A and the second side section 133B include an inward facing protrusion member 135A, 135B at its substantial midlength thereof. The first side section 133A and the first leg 132A are substantially mirror images of the second side section 133B and the third leg 132B. In this way, the flex PCB 121 is substantially symmetrical when viewed from the top.

The first side section 133A and the second side section 133B comprises a first folding line 122A, 122B and a second folding line 123A, 123B. The first folding line 122A, 122B is located at a substantial midpoint between the inward facing protrusion member 135A, 135B and the elbow where the first side section 133A and the second side section 133B join the middle section 130. The second folding line 123A, 123B is located near or at the elbow where the side sections 133A, 133B join the middle section 130. Each of the first folding line 122A, 122B and the second folding line 123A, 123B is parallel to the middle section 130.

The middle section 130 comprises a pair of first folding lines 126A, 126B and a pair of second folding lines 124A, 124B. The first folding lines 126A, 126B are located where the first leg 132A and the third leg 132B join the middle section 130, respectively. The first folding lines 126A, 126B are substantially diagonal (e.g., 45°) relative to the middle section 130. The second folding lines 124A, 124B are located at a substantial midpoint between the first leg 132A and the second leg 131 and the third leg 132B and the second leg 131. The second folding lines 124A, 124B are parallel to the legs 132A, 131, 132B.

The first leg 132A and the third leg 132B comprises a pair of third folding lines 125A, 125B. The third folding lines 125A, 125B are located near where the first leg 132A and the third leg 132B join the middle section 130. The third folding lines 125A, 125B are parallel to the middle section 130.

Figure 2:
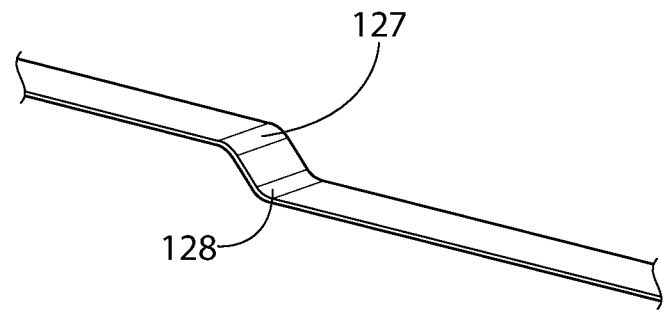
FIG. 2 shows a close-up view how the flex PCB frame structure jogs.
Figure 3:
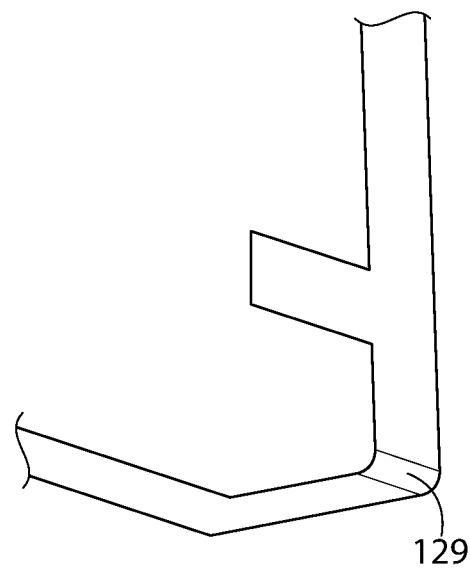
FIG. 3 shows a close-up view of how the flex PCB frame structure bends.

Referring now to FIGS. 2 and 3, there are shown close-up views of how the flex PCB frame structure jogs and bends. As used herein, the terms "jog" or "jogs" mean two bends that change the plane of the flex PCB, as depicted in FIG. 2. More specifically, each jog comprises a first bend 127 and a second bend 128. In the illustrated embodiment, the first bend 127 is positioned above the second bend 128 such that the portion of the PCB adjacent to the first bend 127 is above the portion of the PCB adjacent to the second bend 128. For example, the second folding lines 124A, 124B of the middle section 130 are configured to jog such that the plane of the middle section 130 is not completely coplanar throughout its length. Similarly, the third folding lines 125A, 125B are configured to jog such that the plane of the first leg 132A and the third leg 132B is not completely coplanar throughout its length.

Additionally, the terms "bend" or "bends" mean a single bend that changes the direction of the PCB, as depicted in FIG. 3. The first folding line 122A, 122B and the second folding line 123A, 123B of the first side section 133A and the second side section 133B are configured to bend. The first folding lines 126A, 126B of the middle section 130 are configured to bend diagonally.

Figure 4:
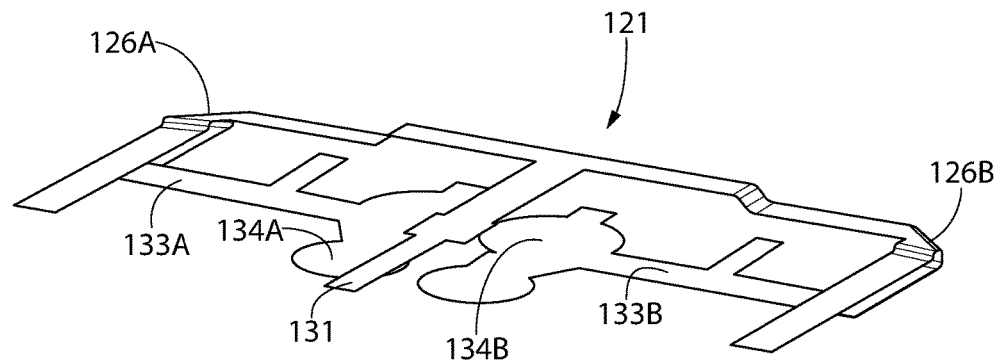
FIG. 4 shows a perspective view of the flex PCB in a stowed position.
Figure 5:
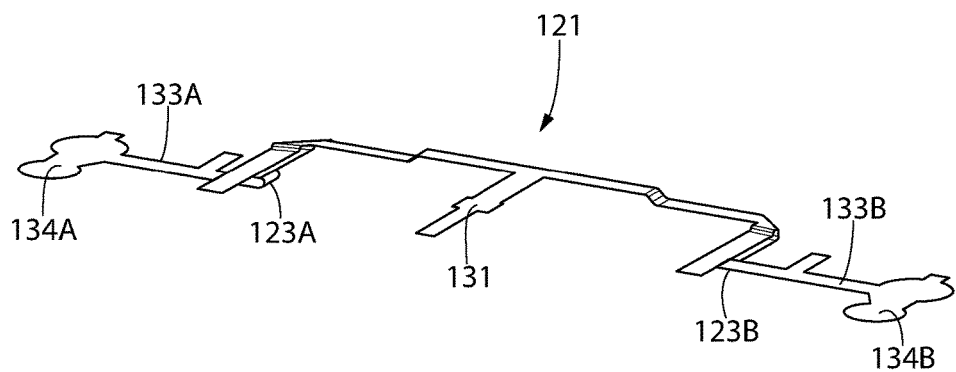
FIGS. 5 and 6 show perspective views of the flex PCB in an extended position.
Figure 6:
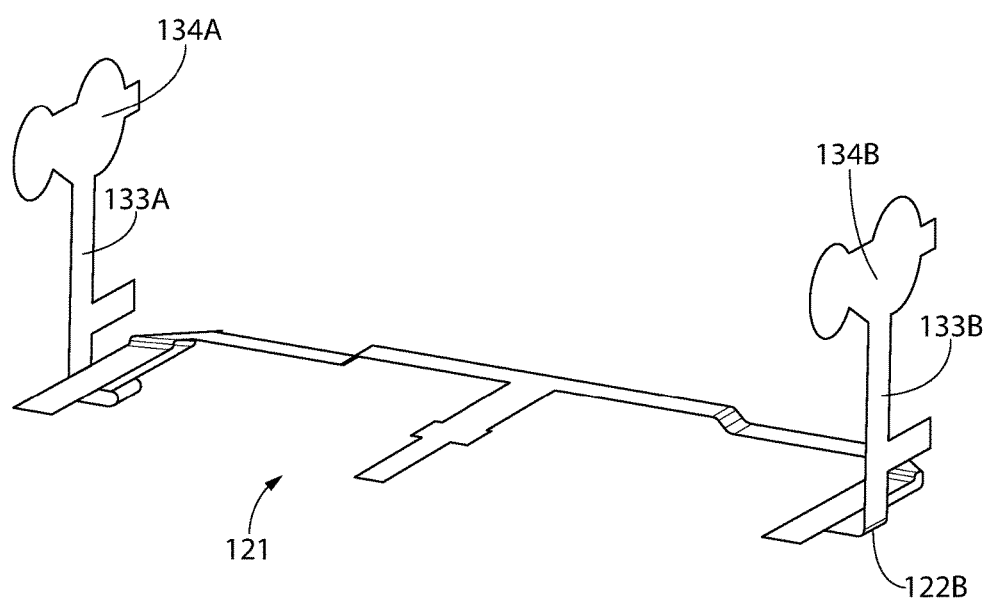

Referring now to FIGS. 4 through 6, there are shown various views of the flex PCB frame structure 121. In a stowed or stored position, the first side section 133A and the second side section 133B are folded at the first folding lines 126A, 126B of the middle section 130 such that the terminal ends 134A, 134B of the side sections 133A, 133B are facing the second leg 131 and toward each other.

In an extended position, the first side section 133A and the second side section 133B are folded at the second folding line 123A, 123B so that the terminal ends 134A, 134B of the first side section 133A and the second side section 133B are facing away from each other and away from the legs. Additionally, the first side section 133A and the second side section 133B can fold at the first folding line 122A, 122B so that the terminal ends 134A, 134B of the first side section 133A and the second side section 133B extend perpendicularly upward. Said another way, the plane of the middle section is perpendicular to the plane of the first and second side sections 133A, 133B.

Figure 7:
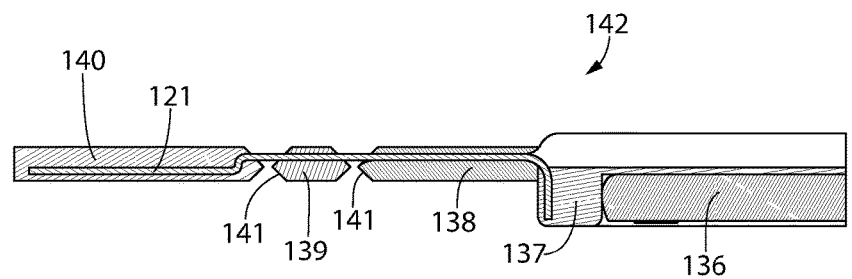
FIG. 7 shows a close-up side cross-sectional view of the present invention as used with a mobile phone.
Figure 8:
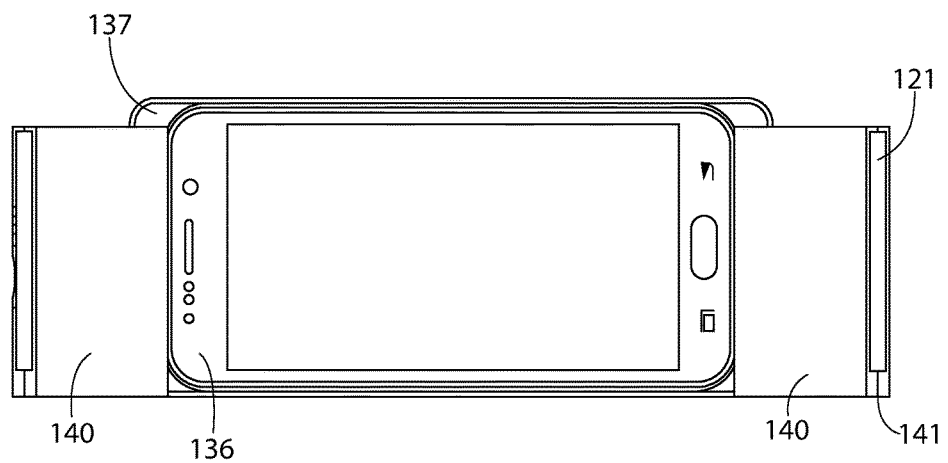
FIG. 8 shows a top down view of the present invention in an extended position as used with a mobile phone.
Figure 9:
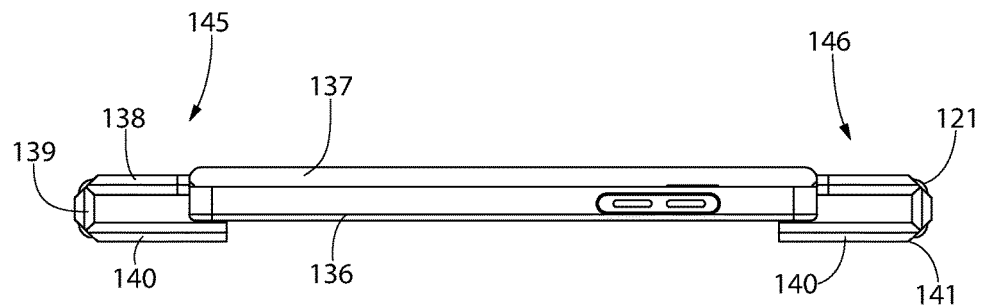
FIG. 9 shows a side elevational view of the present invention in an extended position as used with a mobile phone.
Figure 10:
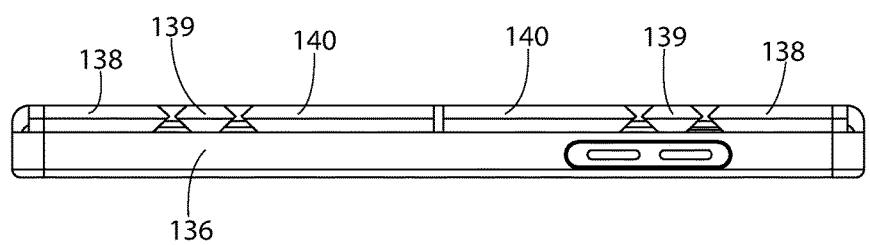
FIG. 10 shows a side elevational view of the present invention in a stowed position as installed on a mobile phone.
Figure 11:
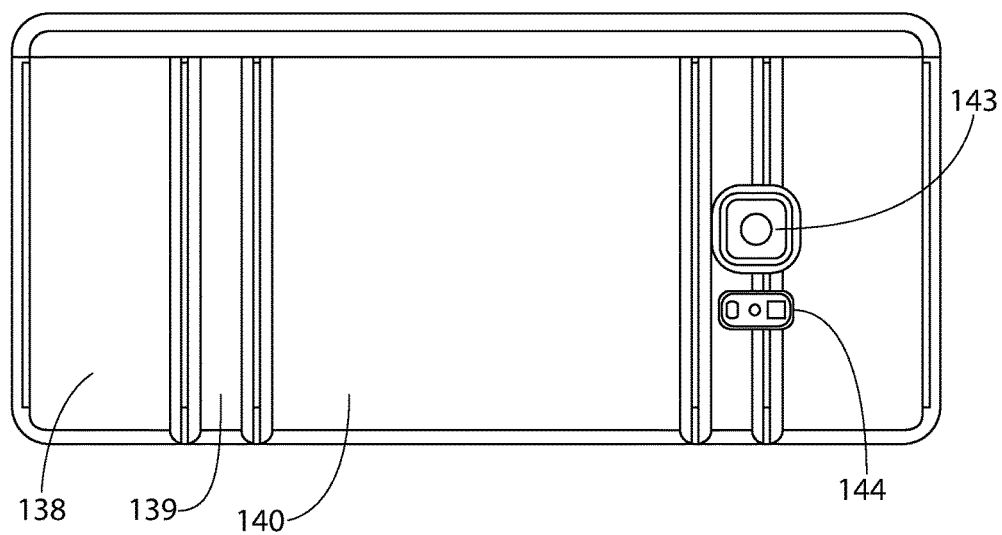
FIG. 11 shows a bottom-up view of the present invention in a stowed position as installed on a mobile phone.

Referring now to FIG. 7, there is shown a cross-sectional side view of the combination controller unit and carrier device 142 of the present invention. The flex PCB 121 is embedded within the carrier device comprising a main section 137 having first and second sections extending therefrom. The main section 137 is configured to removably attach to a handheld electronic device. In the illustrated embodiment, the main section 137 is removably attached to a phone 136.

The main section 137 comprises the middle section of the PCB 121 embedded therein, and each of the first and second sections comprises the first side section and the second side section of the PCB 121 embedded therein, respectfully. Because the flex PCB is embedded within the carrier device, the carrier device is configured to bend with the flex PCB in use. More specifically, each of the first section and the second section is configured to bend at the first folding line and the second folding line of the first and second side sections so as to define a first subsection 138, a second subsection 139, and a third subsection 140. The sides of the subsections 138, 139, 140 at the first and second folding lines are beveled 141 so that the subsections 138, 139, 140 can fold and unfold easily.

Referring now to FIGS. 8 through 11, there are shown various views of the present invention as used with a smartphone. In other embodiments, however, it is contemplated that the device is shaped and configured for use with various types of handheld electronic devices, such as computer tablets, e-readers, MP3 players, and the like. In the illustrated embodiment, the main section 137 comprises a substantially frame-like structure so as to hold the phone 136 therein, providing an unobstructed access to the display screen or the front of the phone 136. It is contemplated that the main section 137 is configured to hold the perimeter of the phone 136 via press-fit, snap fit, or similar means, similar to a conventional phone carrier or case. In this regard, the edges of the main section 137 may be configured to hug or partially wrap around the perimeter of the phone 136. When attached, the middle of the main section 137 sits flush against the back surface of the phone 136. In some embodiments, the main section 137 comprises an open configuration such that it comprises a perimeter and an open middle portion. In some embodiments, the main section 137 comprises a closed configuration such that it comprises a substantially rectangular structure with a flanged perimeter and a recessed portion for holding the phone 136 therein.

In operation, the first subsection 138 of each of the first 145 and second sections 146 are folded outward and then the third subsection 140 are folded toward the front of the phone in a wing-like fashion. The second subsection 139 is substantially perpendicular to the first and second subsections 138, 140 and the subsections 140 frame the display screen of the phone 136. In this regard, the subsections 140 do not obstruct the display screen of the phone 136.

In some embodiments, the third subsections 140 comprises a plurality of buttons (e.g., control buttons, joystick buttons, bumpers) thereon. More specifically, the buttons are disposed on the surface of the third subsections 140 that face upward when the device is in an extended configuration. Thus, the buttons are biased toward the back surface of the phone when the first and second sections are in a stowed position. This prevents the users from accidentally activating the buttons when the device is not in use as a controller.

When stowed, the first 145 and second sections 146, and hence the first subsection 138, the second subsection 139, and the third subsection 140 are positioned flat against the main section 137. The subsections 138, 139, 140 can be substantially coplanar to one another when the first and second sections are in a stowed position. The beveled edges of the subsections 138, 139, 140 at the bend lines allow the PCB 121 embedded within the subsections 138, 139, 140 to bend and flex easily. The present invention is shaped and dimensioned to minimize bulkiness when attached to the phone 136. In this way, the carrier device comprises a low-profile and does not substantially increase the girth of the phone 136.

In some embodiments, one or more of the subsections 138, 139, 140 of the first 145 and second sections 146 further comprise cutouts 143, 144 to prevent the sections from obstructing the phone's camera and flash, thereby allowing the phone's camera and flash to operate properly. Additionally, the main section 137 can comprise one or more cutouts that are aligned with the cutouts 143, 144 of the first and second sections. It is noted that the sections can comprise additional cutouts for other buttons disposed on the exterior of the phone, depending upon embodiments.

Figure 12:
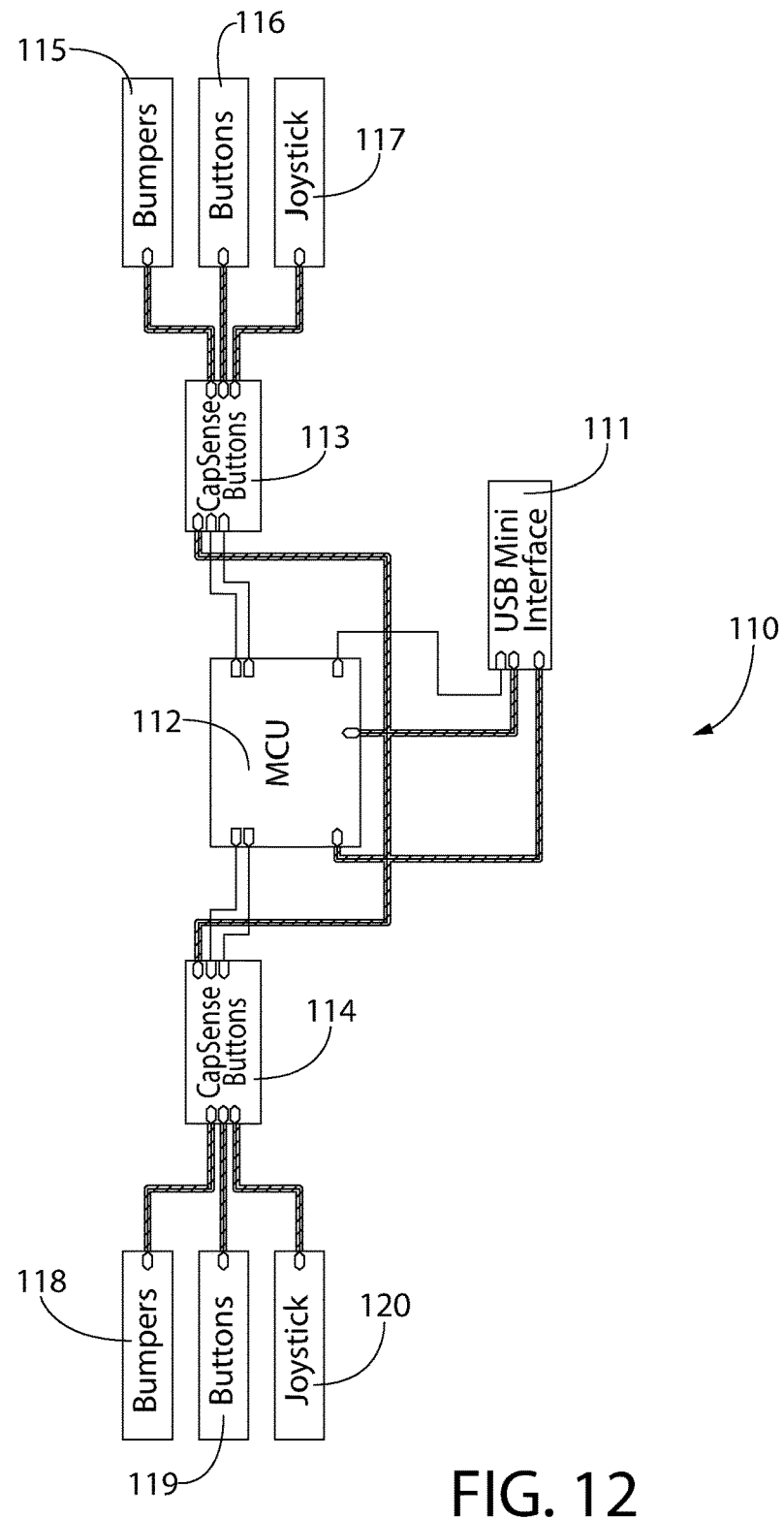
FIG. 12 is a circuit diagram of an exemplary embodiment of the present invention.

Referring now to FIG. 12, there is shown an exemplary embodiment of a circuit connection 110 of the present invention. The present invention comprises a flex PCB having a middle section having a first side section and a second side section extending therefrom. The middle section comprises a microcontroller (MCU) 112, wherein the MCU 112 is operatively connected to a USB mini interface 111.

The MCU 112 is further connected to a right CapSense® button 113 and a left CapSense® button 114. Each of the CapSense® button 113, 114 is connected to a bumper 115, 118, buttons 116, 119, and a joystick 117, 120. In some embodiments, the CapSense® buttons 113, 114 are further connected to other control buttons, such as pause and start/stop buttons, back/forward buttons, trigger buttons, and the like. Each of the bumper 115, 118, buttons 116, 119, and the joystick 117, 120 is located on the first side section and second side section of the flex PCB, and therefore accessible on the first and second sections of the carrier device. Said another way, the first side section comprises a first set of control buttons comprising the bumper 118, the buttons 119, and the joystick 120. Similarly, the second side section comprises a second set of control buttons comprising the bumper 115, the buttons 116, and the joystick 117. The control buttons can be used to provide user input to the phone or another electronic device on which the carrier device is installed. In some embodiments, each of the first and second sections, and hence the first and second set of control buttons, is connected to its own power source and/or a wireless power charger operatively connected to the flex PCB. Alternatively, the first and second sections are connected to a common power source (e.g., the phone) and/or a wireless power operatively connected to the flex PCB.

The present invention utilizes direct connection, Bluetooth®, NFC, or similar means to connect to the phone to which it is attached, thereby allowing for user input via the device. In operation, the signals are brought along the middle section of the flex circuit. The transmission of the signals is not impeded despite the foldable configuration of the device due to the use of flex. The configuration of the circuit allows the signal to reach the first and second side sections of the PCB, and hence, the first and second sections of the device where the control buttons are accessible while still allowing for freedom of movement of the first and second sections.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A combination controller and carrier device, comprising:
    a device comprising a main section configured to removably attach to a handheld device, wherein said device is configured to establish communication with said handheld device;
    a first section and a second section extending from opposing ends of said main section;
    a first set of control buttons on said first section, wherein said first set of control buttons is configured to provide user input to said handheld device in operation;
    each of said first section and said second section folded against a back surface of said main section in a stowed position;
    each of said first section and said second section extended and partially folded onto itself in an extended position such that a terminal end of each of said first section and said second section face each other;
    a flexible PCB embedded within said device, said flexible PCB comprises a middle section, a first side section, and a second side section;
    said first side section and said second side section extending from opposing ends of said middle section;
    said middle section comprising a first leg, a second leg, and a third leg embedded within said main section, wherein said first leg, said second leg, and said third leg are biased away from said first side section and said second side section;
    said first side section embedded within said first section; and
    said second side section embedded within said second section.

2. The device of claim 1, wherein said first section mirrors said second section.

3. The device of claim 1, wherein each of said first section and said second section comprises a first subsection, a second subsection, and a third subsection, further wherein each of said first section and said second section is configured to fold between said first subsection and said second subsection and between said second subsection and said third subsection.

4. The device of claim 3, wherein said third subsection is adjacent to a front side of said handheld device in said extended position.

5. The device of claim 1, further comprising a second set of control buttons on said second section.

6. The device of claim 1, wherein said flexible PCB is connected to said first set of control buttons.

7. The device of claim 1, wherein said first section comprises one or more cutouts.

8. A combination controller and carrier device, comprising:
    a flexible PCB embedded within said carrier device for a handheld device;

said flexible PCB comprising a middle section having a first side section and a second side section extending from opposing ends of said middle section;

a first leg, a second leg, and a third leg connected to said middle section, wherein said first leg, said second leg, and said third leg are biased away from said first side section and said second side section;

each of said first side section and said second side section configured to fold against said middle section to move from a stowed position to an extended position in a substantially wing-like fashion;

a plurality of control buttons operatively connected to said flexible PCB, wherein said plurality of control buttons operate said handheld device.

9. The device of claim 8, wherein said first side section is configured to fold diagonally at said first leg, further wherein said second side section is configured to fold diagonally at said third leg, whereby said first side section and said second side section face toward each other.

10. The device of claim 9, wherein said first side section is configured to fold away from said first leg, further wherein said second side section is configured to fold away from said third leg, whereby said first side section and said second side section face away from each other.

11. The device of claim 9, wherein said first side section is configured to fold perpendicularly from said first leg, further wherein said second side section is configured to fold perpendicularly from said third leg.

12. The device of claim 8, wherein said first side section and said first leg mirror said second side section and said third leg.

13. The device of claim 8, wherein said middle section comprises a pair of jogged portions such that said middle section is not completely coplanar throughout its length.

14. The device of claim 8, wherein said first leg and said third leg comprises a jogged portion such that each of said first leg and said third leg is not completely coplanar throughout its respective length.

15. The device of claim 8, wherein a said carrier device comprises a main section having a first section and a second section extending from opposing ends of said main section;

each of said first section and said second section folded against a back surface of said main section in a stowed position;

each of said first section and said second section extended and partially folded onto itself in an extended position.

16. The device of claim 15, wherein each of said first section and said second section comprises a first subsection, a second subsection, and a third subsection, further wherein each of said first section and said second section is configured to fold between said first subsection and said second subsection and between said second subsection and said third subsection.

17. The device of claim 15, wherein said first section comprises one or more cutouts.

\* \* \* \* \*